(12) United States Patent
Croxford et al.

(10) Patent No.: US 11,709,252 B2
(45) Date of Patent: Jul. 25, 2023

(54) TOPOLOGICAL MODEL GENERATION

(71) Applicants: Apical Limited, Cambridge (GB); Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 569 days.

(21) Appl. No.: 16/547,266

(22) Filed: Aug. 21, 2019

(65) Prior Publication Data

US 2021/0055409 A1    Feb. 25, 2021

(51) Int. Cl.
*G01S 13/88* (2006.01)
*G01S 13/06* (2006.01)
*G01S 13/89* (2006.01)
*H01Q 1/00* (2006.01)

(52) U.S. Cl.
CPC ............ *G01S 13/887* (2013.01); *G01S 13/06* (2013.01); *G01S 13/89* (2013.01); *H01Q 1/00* (2013.01)

(58) Field of Classification Search
CPC ........ G01S 13/887; G01S 13/06; G01S 13/89; G01S 13/42; H01Q 1/00
USPC .......................................................... 342/22
See application file for complete search history.

(56) References Cited

U.S. PATENT DOCUMENTS

| | | | | |
|---|---|---|---|---|
| 5,384,573 A | * | 1/1995 | Turpin | G01S 13/9005 342/179 |
| 6,621,448 B1 | * | 9/2003 | Lasky | G01V 3/12 342/118 |
| 9,559,874 B2 | | 1/2017 | Han et al. | |
| 10,168,414 B2 | * | 1/2019 | Chen | G01S 5/0252 |
| 10,404,261 B1 | * | 9/2019 | Josefsberg | G01S 13/931 |
| 11,036,237 B2 | * | 6/2021 | Fuchs | G01S 13/86 |
| 2002/0175850 A1 | * | 11/2002 | Barnes | G01S 13/0209 342/22 |
| 2006/0019679 A1 | * | 1/2006 | Rappaport | G01S 5/02521 455/456.1 |
| 2007/0109177 A1 | * | 5/2007 | Baath | G01S 13/88 342/25 C |

(Continued)

FOREIGN PATENT DOCUMENTS

| | | | | |
|---|---|---|---|---|
| CN | 105929388 A | * | 9/2016 | |
| EP | 2757013 A1 | * | 7/2014 | B60R 99/00 |

(Continued)

OTHER PUBLICATIONS

Bloesch et al., "CodeSLAM—Learning a Compact, Optimisable Representation for Dense Visual SLAM", Imperial College London, United Kingdom, Apr. 14, 2019.

(Continued)

*Primary Examiner* — Vladimir Magloire
*Assistant Examiner* — Alexander L. Syrkin
(74) *Attorney, Agent, or Firm* — EIP US LLP

(57) ABSTRACT

A method comprising: obtaining pose data representative of a pose of a portable device during observation of an environment comprising an object; obtaining distance data representative of a distance between the object and a receiver during the observation of the environment, using at least one radio waveform reflected from the object and received by the receiver; and processing the pose data and the distance data to generate a topological model of the object.

18 Claims, 3 Drawing Sheets

(56) References Cited

U.S. PATENT DOCUMENTS

| | | | | |
|---|---|---|---|---|
| 2010/0127916 A1* | 5/2010 | Sakai | | G01S 13/89 |
| | | | | 342/135 |
| 2011/0163905 A1* | 7/2011 | Denis | | G01S 7/412 |
| | | | | 342/21 |
| 2014/0132441 A1* | 5/2014 | Kajiki | | G01S 13/06 |
| | | | | 342/146 |
| 2014/0205146 A1* | 7/2014 | Holz | | G06T 7/50 |
| | | | | 382/103 |
| 2016/0061605 A1* | 3/2016 | Georgy | | G01C 21/20 |
| | | | | 701/468 |
| 2016/0266245 A1* | 9/2016 | Bharadia | | G01S 7/038 |
| 2017/0212234 A1* | 7/2017 | Heath | | G01S 13/931 |
| 2017/0256097 A1* | 9/2017 | Finn | | G06F 30/20 |
| 2017/0328997 A1* | 11/2017 | Silverstein | | G01S 13/765 |
| 2018/0112983 A1* | 4/2018 | Ahmed | | G01C 21/005 |
| 2018/0132116 A1* | 5/2018 | Shekhar | | H04W 64/006 |
| 2020/0158862 A1* | 5/2020 | Mahmoud | | G01C 21/30 |
| 2020/0370920 A1* | 11/2020 | Ahmed | | G01C 21/3848 |

FOREIGN PATENT DOCUMENTS

| | | | | |
|---|---|---|---|---|
| EP | E P-2757013 A1 | * | 7/2014 | ...... B60W 30/18145 |
| JP | 2012064026 A | * | 3/2012 | ...... B60W 30/18145 |
| KR | 2018045472 A | * | 5/2018 | ............ B60W 30/16 |
| KR | 20180045472 A | * | 5/2018 | |
| WO | WO-2010046101 A1 | * | 4/2010 | ......... G06K 9/00375 |
| WO | WO-2017004918 A1 | * | 1/2017 | ............. G06F 21/00 |

OTHER PUBLICATIONS

Tang et al., "BA-NET: Dense Bundle Adjustment Networks", Dec. 20, 2018.

Zhang et al., "MeshStereo: A Global Stereo Model with Mesh Alignment Regularization for View Interpolation".

Ronneberger et al., "U-Net: Convolutional Networks for Biomedical Image Segmentation", Freiburg, Germany, May 18, 2015.

* cited by examiner

TOPOLOGICAL MODEL GENERATION

BACKGROUND OF THE INVENTION

Field of the Invention

The present invention relates to generating a topological model of an object.

Description of the Related Technology

A millimeter wave body scanner is a whole-body imaging device used for detecting concealed objects, for example at an airport security checkpoint. In such a scanner, a millimeter wave is transmitted from two antennae as they rotate around an object to be scanned. The size and shape of objects that can be scanned by such a scanner is limited by the size of the scanner.

It is desirable to generate a topological model of an object in a way that is more flexible than existing techniques.

SUMMARY

According to a first aspect, there is provided a method of generating a topological model of an object, the method comprising: obtaining pose data representative of a pose of a portable device during observation of an environment comprising the object; obtaining distance data representative of a distance between the object and a receiver during the observation of the environment, using at least one radio waveform reflected from the object and received by the receiver; and processing the pose data and the distance data to generate the topological model of the object.

According to a second aspect, there is provided a portable device comprising: a receiver; a storage for storing: pose data representative of a pose of the portable device during observation of an environment comprising an object; distance data representative of a distance between the object and a receiver during the observation of the environment; and a topological model of the object; at least one processor communicatively coupled to the storage; and a model generation engine operable to: obtain the pose data; obtain the distance data using at least one radio waveform reflected from the object and received by the receiver; and process the pose data and the distance data to generate the topological model of the object.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
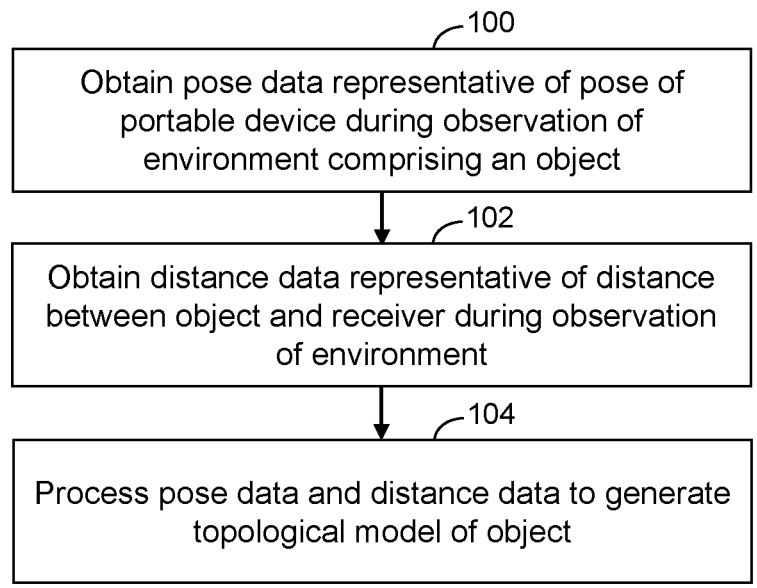
FIG. 1 is a flow diagram illustrating a method of generating a topological model of an object according to examples.

FIG. 1 is a flow diagram illustrating a method of generating a topological model of an object according to examples. A topological model is for example a representation of a geometry of a surface of the object, or a representation from which such a geometry can be derived or otherwise obtained. For example, a topological model may be a surface model of the object, such as a mesh formed of a plurality of polygons, e.g. triangles or quadrilaterals. The polygons generally include vertices, and may be defined by a position of their vertices in a given space. In other examples, the topological model may represent the surface of the object using an oriented patched representation or a surfel (surface element) representation. In other cases, the topological model may be a volume model of the object, in which a cross-sectional thickness of the object is modelled. A volume model may be represented using voxels, which correspond to respective positions within a regular, three-dimensional grid. The surface geometry of an object can be obtained from a volume model of the object by extracting a surface contour or other representation corresponding to the surface of the volume model. This is not intended to be limiting, though, and further topological models may be generated in other examples. For example, the topological model may be or comprise a point cloud, in which a set of points in a 3D space are used to represent a surface of the object.

A topological model may be used for many different purposes. For example, the methods herein may be used to obtain a topological model of a person. From this, an avatar of the person may be generated for use in various augmented reality (AR) or virtual reality (VR) applications. Such an avatar may be used in virtual fitting of garments. For example, using the topological model of the person, an image of the person wearing a particular garment can be rendered, illustrating the fit of that particular garment on the person. Alternatively, the topological model can be used to indicate whether a garment fits a person, or to select a subset of garments that fit a person, from a larger set of garments. In other cases, a topological model of a person may be used for security purposes, for example to identify if the person is carrying an unauthorized item. In yet further cases, body measurements may be extracted from a topological model of a person, which may be used in fitness tracking, in physical rehabilitation, or tracking of growth over time. For example, a series of topological models of a person may be obtained and used to assess the person's recovery from an injury, e.g. by analyzing changes in muscular mass or skeleton movement from the topological models. In some case, a dynamic topological model of a person may be obtained, which represents a person's body topology during movement, e.g. during exercise. Such a model may be used to improve the training or technique of an athlete. In still further cases, the methods herein may be used to generate a topological model of objects other than a person, including dynamic or moving objects. Such models may similarly be used for a wide variety of different purposes, including those involving AR or VR.

At item 100 of FIG. 1, pose data representative of a pose of a portable device during observation of an environment comprising an object to be modelled is obtained. A portable device is for example any device that can be carried or otherwise conveyed by a user. Such a device may be conveyed by the user themselves or by clothing or accessories worn by the user such as in a user's pocket, belt or handbag. For example, a portable device may be a handheld device that is designed to be held in a user's hand during use. In other cases, the portable device may be a wearable device that may be attached to or otherwise supported by the user. For example, a wearable device may be fastened around or rested on a body part of the user, e.g. around a user's wrist, waist or ankle, or on a user's head. As an example, the portable device may be a smartphone or other portable communications device. In other examples, the portable device is an augmented reality (AR) device, such as an AR headset.

The pose of a portable device for example represents the position and orientation of the portable device within the environment. The pose may be represented within any suitable coordinate system, e.g. for representing a three-dimensional space. The pose of the portable device may be obtained in various ways, as discussed further below.

The environment may be any three-dimensional space, which is internal (e.g. inside a building) or external. The environment typically includes a lower surface, although this need not be the case in all implementations. For example, the environment may be an aerial environment. The object may be any item with a material presence. An object is therefore to be considered broadly and includes, among other things, items such as people, animals, furniture, devices or other items that are natural in origin or man-made. The topological model may be of the entirety of the object or of a portion of the object. For example, some of the object may be obscured or inaccessible within the environment. In such cases, the topological object may be of a portion of the object which is unobscured or accessible.

At item 102 of FIG. 1, distance data representative of a distance between the object and a receiver during the observation of the environment is obtained. The distance data is obtained using at least one radio waveform reflected from the object and received by the receiver. The receiver may be any suitable radio receiver, and may form part of a transceiver which is also capable of transmitting waveforms, such as radio waveforms.

Figure 2:
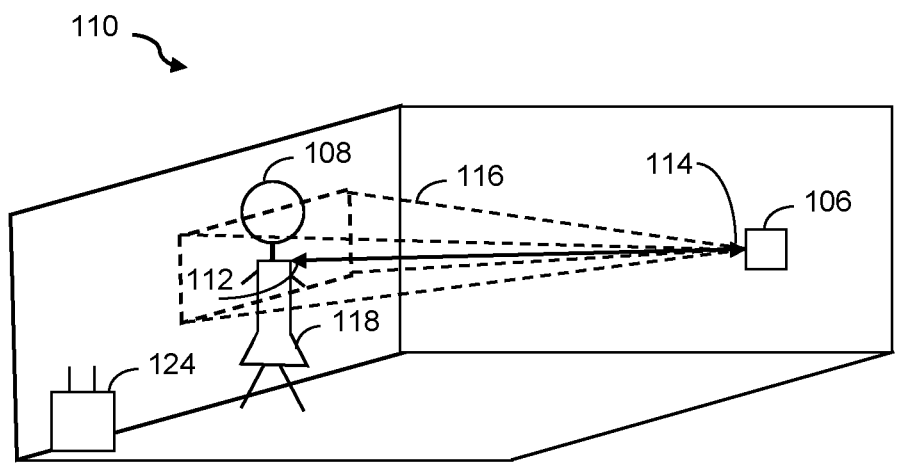
FIG. 2 is a schematic diagram illustrating use of a portable device to generate a topological model of an object according to examples.

An example of receiving a radio waveform is shown schematically in FIG. 2. FIG. 2 is a schematic diagram illustrating use of a portable device 106 to generate a topological model of an object 108. In this example, the portable device 106 is a smartphone and the object 108 is a person, however this is merely an example. The portable device 106 and the object 108 are within an environment 110, which in FIG. 2 is a room. In other examples, though, the methods and/or systems herein may be used in other environments.

In FIG. 2, the portable device 106 transmits at least one radio waveform 112 towards the object 108. The at least one radio waveform 112 transmitted by the portable device 106 in FIG. 2 may be referred to as a transmitted radio waveform. The transmitted radio waveform may be transmitted as a continuous signal or as an intermittent signal, such as a pulsed signal. In some cases, the at least one radio waveform 112 may be transmitted by the portable device 106 in response to a particular condition being met, such as after a given time period has elapsed or after a pose of the object 108 has changed by at a threshold amount. Transmitting the at least one radio waveform 112 intermittently, at regular intervals or otherwise, may save power compared to transmitting the at least one radio waveform 112 continuously. The at least one radio waveform 112 may be beamformed, such that the at least one radio waveform 112 is transmitted in a beamformed direction. Beamforming for example refers to directional signal transmission or reception, and may be referred to as spatial filtering. When used in signal transmission, beamforming generally involves combining signals, e.g. radio signals, transmitted by different ones of a plurality of signal transmitters to create a pattern of constructive and/or destructive interference in a transmitted waveform. This may be performed by controlling a relative phase and/or amplitude of the signals transmitted by the signal transmitters. The phase and/or amplitude of the signals transmitted by the transmitters of the at least one radio waveform 112 may be referred to as beamforming parameters. For example, signals transmitted at a particular angle with respect to the portable device 106 may experience constructive interference, whereas signals transmitted at other angles with respect to the portable device may experience destructive interference. In this way, a spatially selective radio waveform 112 may be generated from omnidirectional transmitters that individually transmit radio waves with a uniform amplitude in all directions perpendicular to a given axis or from isotropic transmitters that individually transmit radio waves with a uniform amplitude in all directions. The beamformed at least one radio waveform 112 for example has a greater amplitude in a particular direction, which may be referred to herein as the beamformed direction.

By beamforming the transmitted radio waveform 112 for reflection from the object 108, surface detail of the object 108 can be determined, due to the spatially selective nature of the beamformed radio waveform. For example, the at least one radio waveform 112 can be reflected from a small portion of a surface of the object 108, allowing the distance between a receiver of the reflected waveform and that portion of the surface of the object 108 to be accurately determined. By reflecting a plurality of radio waveforms 112 from different portions of the object 108, a depth map representative of a distance between the receiver and the surface of the object 108 can be obtained, which can be used to generate a topological model of the object 108. Furthermore, beamforming of the at least one radio waveform 112 can be used to reduce power consumption and simplify generation of the topological model. Furthermore, the depth map obtained from the plurality of radio waveforms 112 (which may be referred to as a radio frequency depth map) may provide different depth information than that obtainable using visual information (e.g. based on processing of an image of the object 108). This is for example because the radio waveforms 112 may interact differently with the environment than electromagnetic radiation with a shorter wavelength than radio waves (such as that within the visible, infrared (IR) or ultraviolet (UV) regions of the electromagnetic spectrum). For example, some materials, such as fabric, may be transmissive to radio waves, but may absorb or reflect visible, IR and/or UV radiation.

In some cases, the at least one radio waveform 112 may be beamformed dynamically. For example, the beamformed direction in which the radio waveform 112 is transmitted may vary over time. This may be used to steer the radio waveform 112 towards the object 108 that is to be modelled. For example, as the portable device 106 is moved relative to the object 108, the beamformed direction may be altered to compensate for the motion of the portable device 106. In this way, the at least one waveform 112 may be transmitted towards the object 108 despite movement of the portable device 106 away from the object 108.

In other cases, beamforming applied to the at least one radio waveform 112 may be static or otherwise constant over time or over a given period of time. For example, the beamformed direction relative to the portable device 106 may remain constant over at least the given period of time. In this way, the transmitter may be moved relative to the object 108 to reflect the at least one radio waveform 112 from a different portion of the object 108. The object 108 may therefore be scanned by moving the portable device 106 relative to the object 108, so as to collect radio waveforms reflected from different portions of the object 108.

In FIG. 2, the transmitted radio waveform 112 in FIG. 2 is reflected from the object 108. The at least one radio waveform 114 reflected from the object 108, which may be referred to as a reflected radio waveform 114, is used to obtain distance data representative of a distance between the object 108 and a receiver during observation of the environment 110. In the example of FIG. 2, the reflected radio waveform 114 is received by a receiver of the portable device 106. The receiver of the portable device 106 in this case forms part of a transceiver, which also includes a transmitter which is arranged to transmit the transmitted radio waveform 112. However, this is merely an example.

The receiver may include at least one antenna of the portable device 106. For example, each of the at least one antenna may be a cellular communications antenna, respectively. A cellular communications antenna is for example arranged to receive radio waveforms that are used for wireless local area networking (WLAN) of device, and may be referred to as a Wi-Fi antenna, for use in wireless communications according to the IEEE (Institute of Electrical and Electronics Engineers) 802.11 family of standards. A Wi-Fi antenna may be referred to as a Wi-Fi radio. The portable device 106 may include a plurality of antennae, in order to provide for beamforming of at least one radio waveform transmitted or received by the portable device 106.

The distance data may be obtained from the at least one radio waveform 114 received by the receiver. For example, the reflected radio waveform 114 may be analyzed to determine the distance between the object 108 and the receiver. Various different approaches may be used to determine this distance.

In some cases, the distance may be determined based on a phase difference between the transmitted radio waveform 112 and the received radio waveform 114. In other cases, the distance may be obtained by measuring a time-of-flight of the radio waveform, e.g. from transmission by a transmitter to receipt by the receiver. For example, a sine radio waveform, which may have a lower frequency, may be transmitted from a transmitter using a further radio waveform as a carrier, which may have a higher frequency. For example, a Wi-Fi signal with a frequency of 60 GHz may be transmitted from a transceiver of the portable device 106, and used as a carrier of a lower frequency sine signal for reflection from the object 108. The reflected sine signal may be received by a receiver and an amplitude of the received sine signal over a plurality of cycles may be used to determine a distance between the object 108 and the receiver. In other cases, the radio waveform may be a square waveform. In such cases, the square waveform may be integrated over time to determine the distance between the receiver and the object 108. In further cases in which multiple receivers are used to obtain the reflected radio waveform 114, triangulation between a time of receipt of the reflected radio waveform 114 at different ones of the receivers may be used to obtain the distance data, e.g. if the layout of the receivers is known, such as their distance with respect to each other. Triangulation may additionally or alternatively involve determining a strength of a signal (e.g. of the reflected radio waveform 114) received at each of the receivers, and using this to determine the distance between the object 108 and the receivers. In further cases, the distance data may represent an attenuation of the at least one radio waveform 112 as the at least one radio waveform 112 propagates within the environment, after reflection from the object 108. In some cases, a combination of two or more of these methods may be used to obtain the distance data.

In examples in which the transmitted radio waveform 112 is beamformed, beamforming data representative of at least one beamforming parameter associated with beamforming of the at least one radio waveform may be obtained and used to obtain the distance data. For example, the beamforming data may be used to determine the beamformed direction of the transmitted radio waveform 112, which may be used to determine the distance between the object 108 and the receiver (which may for example form part of a transceiver comprising the transmitter used to transmit the beamformed radio waveform 112).

In the example of FIG. 2, the portable device 106 comprises an image capture device. Image data representative of an observation of the environment captured by the image capture device may be processed to obtain pose data representative of a pose of the portable device 106 during the observation of the environment. The image capture device may be any image capture device capable of obtaining still or moving images of the environment, such as a camera or a video camera. The image capture device may capture visible light but may also or additionally capture IR or UV radiation. UV radiation for example has a wavelength from around 10 nanometers (nm) to around 380 nm, visible light for example has a wavelength from around 380 nm to around 760 nm, and IR radiation for example has a wavelength from around 1 millimeter (mm) to around 760 nm. The image data may therefore be based on an observation of the environment in at least one of the UV, visible or IR regions of the electromagnetic spectrum. For example, the image data may include at least one of UV image data, visible image data or IR image data, or the image data may representation a combination of at least one of UV, visible or IR information. The image data for example represents photometric characteristics of a scene, such as a brightness, intensity or color. An array of pixel values may be used to represent these photometric characteristics. The image may be grayscale or color. In FIG. 2, the image capture device is arranged to capture images within a field of view 116, which includes the object 108.

Any suitable image processing method may be applied to the image data to determine the pose of the portable device 106. For example, the image data may be processed using simultaneous localization and mapping (SLAM) techniques, which involve constructing or updating a map of the environment while tracking the location of an agent (in this case, the image capture device) within the environment. There are a variety of different SLAM techniques, involving statistical approaches such as the use of a Kalman filter and a particle filter, which provide an estimate of a posterior probability function for the pose of the image capture device and parameters of the map of the environment. Other techniques involve jointly estimating the pose of the image capture device and landmark positions within the environment, such as bundle adjustment and maximum a posteriori estimation. In these examples, the pose of the portable device 106 may be taken to correspond to a pose of the image capture device. In other examples, the pose of the portable device 106 may be taken to correspond to a pose of another portion of the portable device 106, such as another component or a fixed or otherwise predetermined portion of the portable device 106.

In some cases, visual information (such as that obtained by the image capture device) may be combined with other information, such as orientation information obtained by an inertial measurement unit (IMU) of the portable device 106 (such as an accelerometer or gyroscope) and/or depth information obtained by a depth sensor of the portable device 106, to obtain the pose of the portable device 106. For example, the portable device 106 may be arranged to perform a SLAM process based on a combination of image data obtained from the image capture device and readings from at least one IMU. This may be referred to as visual-inertial SLAM. This may be more robust than pose data based solely on the image data, which may be sensitive to sudden movements of the portable device 106, which may result in blurry images. For example, an Extended Kalman Filter (EKF) or bundle adjustment (BA) process may be used to combine image data and inertial data obtained from at least one IMU in such a way that the accuracy of the calculated pose is higher than that of a pose obtained using the image data or the inertial data separately.

A pose for example represents a position and an orientation of a given agent, such as the portable device 106. The pose may be represented as a 6DOF (6 degrees of freedom) transformation matrix, and may vary over time, e.g. as video data or a series of still images is recorded. For example, the portable device 106 typically has a different pose at two different times, as the portable device 106 is moved with respect to the object 108 to be modelled. The pose data may therefore be used to determine movement of the portable device 106 within the environment. SLAM, such as segmented SLAM, performed using the image data may be used to determine how the object 108 moves in the environment, such as a pose of the object 108 within the environment. Hence, by combining this information, the pose of the portable device 106 relative to the object 108 may be determined, even in cases whether the object 108 is moving. In cases where the object 108 is stationary, determining the pose of the object 108 within the environment may be omitted, though.

In some cases, the image data represents at least one image in which at least part of the object is obscured by a further object. In such cases, the at least one radio waveform may be transmitted through the further object before and after being reflected from the object and before being received by the receiver. This is shown in FIG. 2, in which the object 108 (which in this case is a human being) is obscured by clothing 118. In such cases, a topological map obtained based solely on images of the object 108 would not necessarily accurately reflect the underlying topology of the person's body, as this body topology is obscured by the clothing 118. However, the distance data is obtained using the transmitted radio waveform 112, which is transmitted through the clothing 118, reflected from the underlying body 108, and is then again transmitted through the clothing 118 before being received by the receiver of the portable device 106. Hence, the distance data in this case is indicative of the distance between the receiver and the underlying object (in this case, the body 108), rather than the distance between the receiver and the obscuring object (in this case, the clothing 118). The methods herein therefore allow a topological map of an object to be obtained, even if the object is obscured by another object which absorbs or reflects visible light, but is at least partly transmissive to radio frequency electromagnetic radiation.

The at least one radio waveform received by the receiver and used to obtain the distance data may have a frequency within a range of approximately 40 gigahertz (GHz) to approximately 60 GHz. Such a frequency has a relatively short wavelength, allowing detail in a surface topology of the object to be resolved by reflection of the at least one radio waveform from the object. Clothing (for example cloth or fabric clothing, produced by weaving or knitting textile fibers, including synthetic fibers) is generally at least partially transmissive to wavelengths within this frequency range. However, human skin is at least partially reflective for these wavelengths. Hence, use of at least one radio waveform with a frequency within this range allows underlying body topology to be modelled for a human, without the human having to remove clothing. Other objects, such as furniture or walls, may also transmit or absorb radio waveforms within this frequency range. This reduces spurious reflections from background objects that are not part of the human to be modelled. Image data obtained by an image capture device, which is for example based on an observation of the environment in at least one of the UV, visible or IR regions of the electromagnetic spectrum, may be considered to capture the visual depth of an object (which may be referred to as a non-radiofrequency (non-RF) depth). The visual depth for example refers to a depth of the object that would be observable by a viewer (or that would be observable using IR and/or UV regions of the electromagnetic spectrum). Where the portable device includes a depth sensor, the depth sensor may also be considered to capture another form of visual depth of the object. In contrast, the distance data obtained using the at least one radio waveform may be considered to capture the radiofrequency (RF) depth of the object, which is for example the depth of the object as obtained using radiofrequency waveforms.

Furthermore, certain wireless networking standards, including the IEEE 802.11ad and the IEEE 802.11ag standards, use radio waveforms within this frequency range. Wireless antennae arranged to produce signals to provide for wireless networking according to these standards can therefore also produce radio waveforms for use with the methods herein. The methods herein can hence be performed using portable devices that are configured to perform wireless networking according to these standards, without requiring additional components.

In some cases, the image data may be processed to obtain attenuation data representative of an estimated attenuation of the at least one radio waveform by at least part of the object. The attenuation data may be used to obtain the distance data. For example, the image data may be processed using any suitable image processing technique to identify material properties associated with the object, such as a material the object comprises or is manufactured from, from which the attenuation data may be obtained. As an example, a neural network architecture such as a convolutional neural network (CNN) can be used to process the image data to identify that the object belongs to a particular class of objects, such as human beings. The material properties may be taken as the material properties associated with that particular class of objects. For example, if it is determined that the object is a human being, the estimated attenuation may be taken as the estimated attenuation of human skin. In other cases, the estimated attenuation may be determined from the image, without first identifying a class of objects the object belongs to. For example, the material of the object may be determined from the image of the object, without classifying the object into a particular class. In such cases, the estimated attenuation may be taken as the estimated attenuation of the material of the object.

The estimated attenuation may be used to obtain a more accurate estimate of the distance date. For example, without use of the attenuation data, it may be assumed that the reflected radio waveform 114 is reflected from a surface of the object, without penetrating beyond the surface of the object. In practice, though, the reflected radio waveform 114 may penetrate at least partially into the object and be at least partially attenuated by partial absorption by the object, before being reflected by the object. Such effects may be accounted for by using the estimated attenuation, to more closely model the interaction of the at least one radio waveform with the object.

Referring back to FIG. 1, at item 104 of FIG. 1, the pose data and the distance data are processed to generate the topological model of the object. The distance data may represent the distance between the receiver and the object during observation of the environment comprising the object. However, the receiver (which e.g. forms part of the portable device 106) may move relative to the object during the observation of the environment. This may mean that the distance data may not accurately reflect a distance between a surface of the object and a reference plane. For example, two radio waveforms may be reflected from two different portions of the object that are nevertheless at the same distance from the reference plane. However, a first radio waveform may be reflected from a first portion of the object with the receiver at a first distance from the object. A second radio waveform may be reflected from a second portion of the object with the receiver at a second distance from the object, which is different from the first distance. Using the first and second distances alone, it may be incorrectly determined that the first and second portions of the object are at different distances from the reference plane. However, using the pose data (which reflects a pose of the portable device 106 during the observation of the environment), the first and second distances may be appropriately adjusted to compensate for the different pose of the portable device 106 during receipt of the first and second radio waveforms. In this way, an accurate topological model of the object may be obtained.

Figure 3:
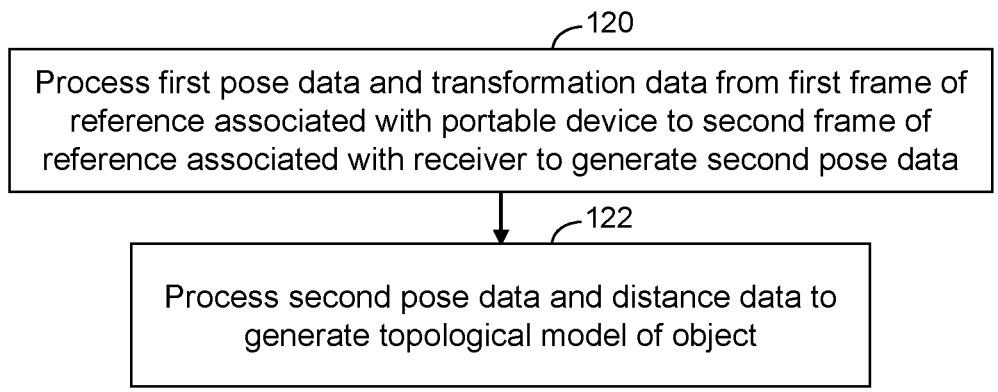
FIG. 3 is a flow diagram illustrating features of a method of generating a topological model of an object according to further examples.

FIG. 3 is a flow diagram illustrating features of a method of generating a topological model of an object according to further examples.

At item 120 of FIG. 3, first pose data representative of a pose of the portable device during observation of the environment and transformation data representative of a transformation, during the observation of the environment, from a first frame of reference associated with the portable device to a second frame of reference associated with the receiver are processed. In this way, second pose data representative of a pose of the receiver during the observation of the environment may be generated. The transformation may be a fixed or otherwise predetermined transformation between the first and second frames of reference. This may be the case where the portable device 106 includes the receiver, which may e.g. comprise at least one antenna, and where the receiver is in a fixed position relative to a body of the portable device 106. For example, the receiver may comprise at least one hardware component of the portable device 106, with a fixed position relative to other components of the portable device 106. A distance between the image capture device and the receiver may be used to transform the first pose data from the first frame of reference to the second frame of reference. In other cases, though, such a transformation may be applied during the calculation of the pose of the portable device, rather than separately. In these cases, the pose of the portable device may correspond to the pose of a receiver of the portable device.

At item 122 of FIG. 3, the second pose data and the distance data are processed to generate the topological model of the object. As explained above, the distance data for example represents a RF depth of the object, as obtained using radiofrequency information. For example, after obtaining a pose of the receiver during the observation of the environment, e.g. as represented by the second pose data, a further transformation of the pose of the receiver into a reference frame, such as a world frame associated with the environment, may be obtained. This transformation may be used to similarly transform the distance data into the reference frame, so that the distances obtained are expressed with respect to the same reference frame. These distances may be taken relative to a particular two-dimensional (2D) reference plane in the reference frame.

By obtaining a plurality of distances between the reference plane and different respective portions of a surface of the object, a topological model of the object may be generated. For example, these distance values may be taken as pixel values corresponding to respective depth pixels of a depth map representative of a depth of the surface of the object relative to the reference plane. The depth map may be taken as the topological model of the object. It is to be appreciated a depth map may provide more than a surface location of an object. A depth map may provide information about the free space between a reference plane (such as a plane associated with the portable device or an image capture device of the portable device) and the surface of the object.

The topological model may, for example, be expressed as a mesh representation of a surface of the object, or as a voxel model, which represents the object in terms of voxels, which may be considered to correspond to volume pixels. A voxel for example represents a value on a regular grid in a 3D space. Each voxel may have a corresponding signed-distance function (SDF) value, which models an extent of an object within the volume. The SDF for example provides a useful surface representation of the free space between the object and the reference plane. The SDF typically defines the signed distance from a point in a volume to a nearest point on the surface, where the sign delineates regions of space that are closest to a front (positive sign) or back (negative sign) of the surface. The truncated SDF (TSDF) typically defines a limited SDF near the surface and truncates the distance value where the unsigned distance is above a particular threshold. For example, the TSDF may use a given threshold (th) value that defines an interval [−th, th]. Voxels that are within this interval may be considered to belong to the object surface. in this way, the TSDF values for example indicate whether a voxel of a given 3D volume (which e.g.

represents the observed environment) belongs to free space outside of the object or to filled space within the object. In further cases, the topological model may be a point cloud.

A 2D image of the topological model of the object may be obtained from the topological model, e.g. by ray-tracing using the TSDF values of a voxel model. Ray-tracing for example uses the pose data and the 3D volume to step along projected rays within a given step-size and to search for a threshold-crossing point as defined by the TSDF values in the 3D. Rendering may be dependent on a probability that a voxel belongs to a foreground (i.e. that the voxel forms part of the object being modelled). For a given object, a renderer may store a ray length of a nearest intersection with a zero-crossing point and may not search past this ray length for subsequent object instances. In this manner occluding surfaces may be correctly rendered.

In examples in which the portable device 106 includes an image capture device arranged to obtain image data, processing the pose data and the distance data may include processing the pose data, the distance data and the image data to generate the topological model of the object. In such examples, the image data may represent at least one color image of the environment and a color of the topological model may be derived from the at least one color image. As explained above, the image data may be based on electromagnetic radiation in the UV, visible and/or IR regions of the electromagnetic spectrum. Depth information from a non-RF depth sensor may also be used to generate the topological model. Depth pixels, polygons or voxels of a topological model of the object may be associated with respective colors, which may be derived from the image data. In such cases, during rendering of the 2D image of the topological model, the color of the rendered pixels may be obtained from an associated color of the voxels of the topological model of the object, so as to render the pixels with a color that depends on a corresponding color of the image captured by the image capture device. For example, elements of the topological model may have a color which is the same as or otherwise corresponds to corresponding portions of the object, as obtained from the image data. Furthermore, if color, visual depth (e.g. obtained using a non-RF depth sensor), UV, IR and RF depth information (e.g. as represented by the distance data) are obtained, multiple views of the same object could be obtained. For example, a 3D model of the object and a topological model of the object could be obtained. These models may further be overlaid with or include color, UV and/or IF information.

Referring back to FIG. 2, in the example of FIG. 2, the transmitted and reflected radio waveforms 112, 114 are transmitted and received by the transceiver of the portable device 106. However, in other cases, the transmitted and reflected radio waveforms 112, 114 may be transmitted and reflected by different devices, respectively. For example, the at least one radio waveform 114 reflected from the object 108 may comprise a radio waveform originated from a transmitter of a device separate from the portable device 106. In such cases, the at least one radio waveform 114 reflected from the object 108 may be received by a receiver of the portable device 106.

The arrangement of FIG. 2 may be adapted for such a method, in which the transmitted and reflected radio waveforms 112, 114 are transmitted and reflected by different devices. The arrangement of FIG. 2 includes a wireless access point (WAP) 124, which is for example a hardware device that allows other Wi-Fi enabled devices, such as the portable device 106, to wirelessly connect to a wired network, such as a wired local area network (WLAN), typically the Ethernet. The WAP 124 may comprise or be connected to a router. The wireless access point 124 of FIG. 2 may include a transmitter, which is configured to transmit at least one radio waveform for reflection from the object to be modelled. For example, the transmitter of the WAP 124 may be configured to beamform the at least one radio waveform, to transmit the at least one radio waveform in the direction of the object. The at least one radio waveform transmitted by the WAP 124 may be similar to or the same as the transmitted radio waveform 112 described above; a corresponding description is to be taken to apply. The transmitter of the WAP 124 may be or include at least one antenna, such as at least one cellular communications antenna for transmitting a Wi-Fi signal, e.g. in accordance with an IEEE 802.11 family of standards. In other cases, an environment similar to that of FIG. 2 may include at least one further device, alone or in addition to the WAP 124, which may be used to transmit at least one radio waveform for reflection from the object. Where the environment includes a further device and the WAP 124, the further device may also wirelessly connect to the wired network via the WAP 124. To simplify a determination of the distance between the at least one further device, the portable device and/or the WAP 124, the further device may be a static device rather than a portable device. The further device may be a wireless device, such as a television, display device, or desktop computing device. In other cases, though, the further device may be a portable device, such as a tablet, laptop or smartphone. In some cases, readings from multiple devices (such as at least one WAP, smartphone, display device etc.) may be used together to obtain the topological model of the object 108. The location of a particular device may be determined through signal attenuation or visually (for example using computer vision or segmented SLAM, based on at least one image of the device within the environment). Radio waveforms from each device may be uniquely identifiable. For example, each device may transmit radio waveforms with a unique identifier. In such cases, at least one of these devices may be interrogated to determine beamforming parameters associated with a beamformed radio waveform transmitted by the respective device and/or to control beamforming of radio waveforms transmitted by other devices within the environment.

In cases in which the WAP 124 transmits at least one radio waveform for reflection from the object, the transmitted radio waveform may be received by a receiver which is separate from the WAP 124, such as a receiver of the portable device 106, which may be similar to the receiver described above for receipt of the reflected radio waveform 114 of FIG. 2. In such cases, the distance data may be processed to determine the distance between the object and the receiver during the observation of the environment. For example, a further radio waveform may be transmitted by the WAP 124 and received by the receiver (or vice versa), and used to determine a distance between the WAP 124 and the receiver, which may in turn be used to determine the distance between the object and the receiver from the reflected radio waveform reflected from the object and received by the receiver. For example, the portable device 106 may process image data, and in some cases inertial data too, to determine the pose of the portable device 106 in the environment. The portable device 106 may then determine the distance between the transmitter (in this case, the WAP 124) and a receiver of the portable device 106 by processing the further radio waveform, which is received directly from the transmitter. The further radio waveform is distinguishable from the at least one radio waveform 112 reflected from the object, for example using metadata associated with the waveforms (such as an identifier associated with the waveforms) or based on characteristics of the waveforms (such as a frequency). The portable device 106 receives the at least one radio waveform 112 reflected from the object and, based on the distance between the transmitter and the receiver, generates the distance data representative of the distance between the object and the receiver. It is to be appreciated, though, that the environment 110 of FIG. 2 is merely an example. Other examples may have numerous sources of radio waveforms, such as more than one portable device and/or more than one WAP. Where there are multiple devices within the environment, signal attenuation and/or triangulation may be used to determine the distance data. For example, if the object is initially between the WAP 124 and the portable device, the strength of the signal from the WAP 124 may increase if the portable device is subsequently moved to a different position in which the object is no longer between the WAP 124 and the portable device. For example, the signal from the WAP 124 may decrease or increase depending upon whether it is absorbed by objects in the environment, or not.

Figure 4:
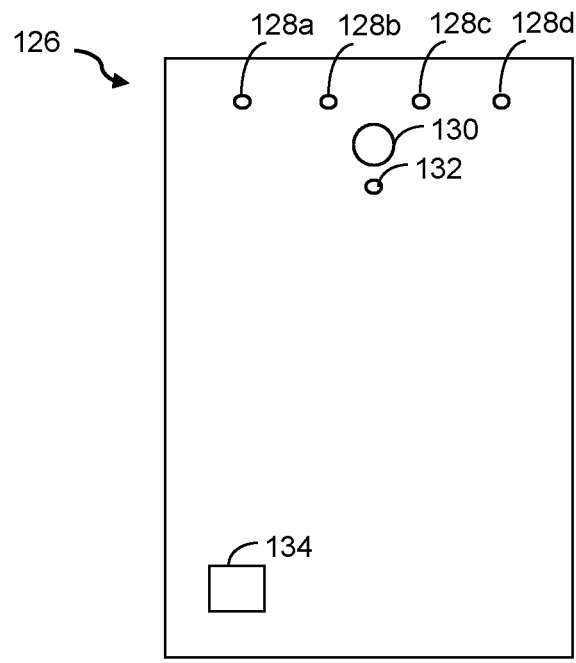
FIG. 4 is a schematic diagram of a portable device according to examples.

An example of a portable device 126 for use with the methods described herein is shown schematically in FIG. 4. The portable device 126 of FIG. 4 is a smartphone, which is for example a cell phone (sometimes referred to as a mobile phone) capable of performing various computing functionalities. For example, a smartphone may include an operating system and software applications for various different purposes e.g. web browsing and/or multimedia functionality such as music streaming, video streaming, or gaming. This is merely an example, though, and the methods described herein may be performed using other portable devices in other cases. The portable device 106 of FIG. 1 may be the same as the portable device 126 of FIG. 4, or may differ in one or more respects.

The portable device 126 of FIG. 4 includes a receiver for receiving at least one radio waveform reflected from an object for which a topological model is to be generated. In FIG. 4, the receiver comprises a plurality of antennae 128a, 128b, 128c, 128d (collectively referred to with the reference numeral 128). A layout of the antennae 128 may be provided, e.g. as metadata, which may be stored in storage of or accessible to the portable device 126. For example, the metadata may be stored in hardware of the portable device 126. In other cases, a layout of the antennae 128 may be determined by transmitting and receiving test signals.

There are four antennae 128 in FIG. 4, but this is merely an example and other portable devices may include more or fewer antennae (or may include a different receiver). The antennae 128 of FIG. 4 are cellular communications antennae. In FIG. 4, the antennae 128 are also capable of transmitting radio waveforms. Hence, the receiver of FIG. 4 may be considered to form part of a transceiver comprising the antennae 128. In other cases, though, a portable device may include a receiver and a transmitter comprising different components, or the portable device may omit a transmitter (e.g. if the radio waveform reflected from the object was initially transmitted by a separate device, such as a WAP).

The portable device 126 of FIG. 4 includes an image capture device 130, such as a camera or video camera, which is configured to obtain image data representative of an observation of an environment. The image data may be used to determine a pose of the image capture device 130 and/or the portable device 126. As explained above, in some cases, the image data is combined with inertial data to determine the pose.

The portable device need not include an image capture device, though. For example, in some cases, the pose of the portable device 126 may be determined without the use of image data. For example, in FIG. 4, the portable device 126 includes a depth sensor 132 and an inertial measurement unit (IMU) 134, in addition to the image capture device 130. At least one of the depth sensor 132 and the inertial measurement unit (IMU) 134 may be used to obtain the pose data, either alone or in combination with each other and/or the image capture device 130 (if present). A depth sensor 132 can for example determine the visual depth of an observed environment, which may be referred to as the non-RF depth, as discussed above. This may be correlated with other data, such as the image data or inertial data obtained by the IMU 134, to determine the pose of the portable device 126. A depth sensor 132 may include, for example, a time-of-flight (ToF) camera, which emits an infrared light signal and determines a depth of the environment based on the time taken for the light signal to return to the ToF camera after reflection from the environment. A field of view of the depth sensor 132 may be similar to or same as a field of view of the image capture device 130, or different. An IMU 134 is for example a device that measures a force, angular rotation and/or orientation of a body (e.g. the portable device 126 in this case). The IMU 134 may include an accelerometer and/or a gyroscope, for example.

Figure 5:
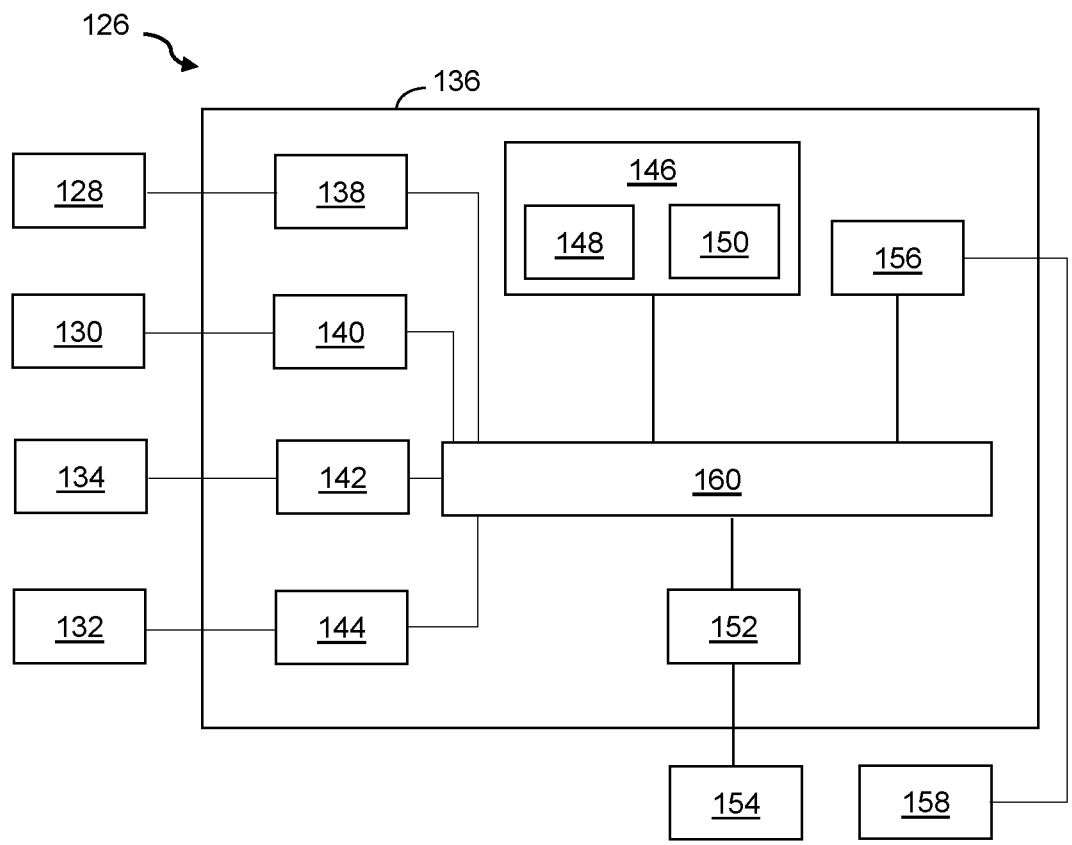
FIG. 5 is a schematic diagram illustrating internal components of the portable device of FIG. 4.

FIG. 5 is a schematic diagram illustrating internal components of the portable device 126 of FIG. 4. The portable device 126 includes a computing system 136, which may be implemented in hardware, such as appropriate integrated circuitry. For example, the computing system 136 may be an on-chip computing system such as an application-specific integrated circuit (ASIC), which is a microchip designed for a particular purpose. In other cases, though, the computing system 136 may be implemented in software or in a combination of hardware and software.

The computing system 136 includes a Wi-Fi controller 138, which is connected to the antennae 128 (which in this case are Wi-Fi antennae). The Wi-Fi controller 138 for example acts as an interface to the antennae 128 and may be used to transmit and/or receive signals (e.g. radio waveforms) via the antennae 128. For example, the Wi-Fi controller 138 may be configured to control the antennae 128 to transmit at least one radio waveform in accordance with various beamforming parameters, to transmit a beamformed radio waveform. The beamforming parameters may for example be obtained by the Wi-Fi controller 138 from storage accessible to the Wi-Fi controller 138. The beamforming parameters may be input or otherwise controlled via an appropriate beamforming application, e.g. implemented in software. The beamforming parameters may be transferred to the Wi-Fi controller 138 via a Wi-Fi application programming interface (API), which acts as an interface between the Wi-Fi controller 138 and the beamforming application.

The at least one radio waveform transmitted and/or received by the antennae 128 is for example associated with an identifier. This identifier may be used to select radio waveforms originating from a particular device, e.g. in cases where there are multiple portable devices within the same environment, each transmitting their own radio waveforms.

The portable device 126 may be arranged to communicate with a WAP, such as the WAP 124 of FIG. 2, via a particular Wi-Fi channel. A channel for example refers to a particular band of frequencies of radio waveforms. In some cases, the portable device 126 may be configured to transmit and/or receive at least one radio waveform using a channel which varies over time and/or which other portable devices in a vicinity of the portable device are not using. The channel may be controlled by the Wi-Fi controller 138, which for example controls the signal transmitted by the antennae 128. This may allow background radio waveforms transmitted by other portable devices to be distinguished from radio waveforms reflected from the object to be scanned, e.g. where such reflected radio waveforms are within a particular frequency channel.

The Wi-Fi controller 138 may be arranged to determine attenuation of at least one radio waveform received by the antennae 128, e.g. at least one radio waveform reflected from the object, for example for use in determining the distance between the antennae 128 and the object. In examples in which triangulation is used in determining this distance, the Wi-Fi controller 138 may be used to determine triangulation information from the antennae 128, e.g. based on a signal strength of a radio signal received by respective antennae of the antennae 128 or based on a relative time of receipt of the radio signal by different respective antennae.

An image capture device 130 is connected to an image signal processor (ISP) 140 of the computing system 136, e.g. via a camera serial interface (CSI). In this way, image data captured by the image capture device 130 can be transferred to the ISP 140. The ISP 140 may perform initial processing of the image data (such as individual frames of a video) to prepare an image or video for display or for further processing (e.g. to generate the topological model described herein). For example, the ISP 140 may perform saturation correction, renormalization, white balance adjustment and/or demosaicing, although this is not to be taken as limiting.

The computing system 136 further includes an IMU interface 142 and a depth sensor interface 144. The IMU interface 142 is arranged to receive inertial data from the IMU 134, and the depth sensor interface 144 is arranged to receive depth data from the depth sensor 132, which is for example visual depth data, which may be referred to as non-RF depth data. In some cases, though, the depth sensor 132 may be omitted from the computing system 136. The inertial data and the depth data (if available) may then be stored and/or processed, e.g. for generating pose data to obtain the topological model of the object.

The computing system 146 of FIG. 5 includes at least one processor, in this case a processor system 146. The processor system 146 may form part of or include a system on a chip (SoC) arrangement. The at least one processor is for example configured to perform the methods described herein. In this example, the processor system 146 includes a central processing unit (CPU) 148 and a graphics processing unit (GPU) 150. The CPU 148 for example executes various drivers to control other components of the computing system 146, such as the various interfaces for controlling the antennae 128, the image capture device 130, the depth sensor 132 and the IMU 134. The GPU 150 may be used for graphics processing and/or other general purpose processing.

In other examples, though, the computing system 136 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration.

Components of the processor system 146 may be communicatively coupled via at least one bus, which may have a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the processor system 164 comprises computer-useable volatile and/or non-volatile memory configured to store information and/or instructions for the processor components, which may be considered to correspond to local storage of the processor system 146. The computer-useable volatile and/or non-volatile memory may be coupled with the bus. The computer-useable memory may comprise random access memory (RAM) and/or read-only memory (ROM). For example, the processor system 164 may be configured to implement, or may comprise computer-useable instructions configured to implement, a model generation engine to generate a topological model of an object in accordance with examples described herein. For example, the model generation engine may be operable to obtain pose data representative of a pose of the portable device 126 during observation of an environment comprising an object. The model generation engine may be further operable to obtain distance data representative of a distance between the object and a receiver during the observation of the environment, using at least one radio waveform reflected from the object and received by a receiver of the portable device 126 (in this case, the antennae 128). The model generation engine may be further operable to process the pose data and the distance data to generate the topological model of the object. The pose data, distance data and topological model may be stored in local storage of the processor system 146 or in other storage of or accessible to the computing system 136, as discussed further below. The model generation engine may be operable to process additional data, such as the image data, the depth data and/or the inertial data, to generate the topological model (e.g. as discussed in other examples here).

The computing system 136 of FIG. 5 also includes a dynamic memory controller (DMC) 152 which may be used to control access to storage 154 accessible to the computing system 136. The storage 154 is for example configured to store the image data received from the ISP 140, and may be arranged to store any of the other data described herein, such as the depth data, the inertial data, the topological model, the distance data and/or the pose data.

The storage 154 in this case is external to the computing system 136 and may be a random access memory (RAM) such as DDR-SDRAM (double data rate synchronous dynamic random access memory). For example, the storage 154 may be storage of the portable device 126, which is e.g. accessible to other components of the portable device 126 than the computing system 136. In other examples, the storage 154 may be or include a non-volatile memory such as Read Only Memory (ROM), non-volatile memory (NVRAM) or a solid state drive (SSD) such as Flash memory. The storage 154 in examples may include further storage devices. The storage 154 may be removable or non-removable from the portable device 126.

The computing system 136 of FIG. 5 further includes a display controller 156 which is arranged to control the display of images and/or video using a display device 158 of the portable device 126. An output of the display controller 156 may be connected to a display driver, for example by a control line or wire. The display driver may include driver stages for converting the display data representative of an image or video to be displayed to appropriate voltages and/or signals for application to the display device 158. In this way, the display controller 156 may control the display device 158 to output an image representative of the topological model of the object, or to output other images and/or video.

The components of the computing system 136 in the example of FIG. 5 are interconnected using a systems bus 160. This allows data to be transferred between the various components. The bus 160 may be or include any suitable interface or bus. For example, an ARM® Advanced Microcontroller Bus Architecture (AMBA®) interface, such as the Advanced eXtensible Interface (AXI), may be used.

Figure 6:
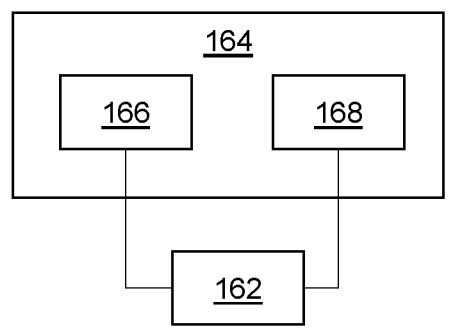
FIG. 6 is a schematic diagram illustrating a security system according to examples.

As explained above, in some cases methods herein may be used to obtain a topological model of a person's body. Such a topological model may be stored in a secure manner, e.g. in accordance with a user's privacy requirements. FIG. 6 illustrates schematically a security system 162 to provide for secure storage of a topological model according to examples.

The security system 162 of FIG. 6 is arranged to control the transfer of data between different areas of storage 164, which may be used as the storage 154 of FIG. 5 or as the storage of the processing system 146 of FIG. 5. Alternatively, the storage 164 of FIG. 6 may be used to store a topological model of an object within a different system than that of FIG. 5.

The storage 164 comprises a first security domain 166 for storing the topological model and a second security domain 168 for storing application data representative of at least one application, which may be a mobile application (sometimes referred to as a mobile app) designed to operate on a smartphone. A security domain for example refers to a set of data that has been partitioned or otherwise separated from another set of data (associated with a different security domain). Each security domain may be managed and accessed separately. For example, the first security domain 166 may be considered to correspond to a private security domain 166 for storing private data that a user does not wish to share with other users or other applications. The first security domain 166 may be considered to correspond to a secure zone, which may be referred to as a trusted zone, for storage of private or sensitive data, such as a topological model of a user's body. In contrast, the security requirements associated with the second security domain 168 may be less restrictive than those associated with the first security domain 166. For example, data of the second security domain 168 may be freely shared with other security domains, such as the first security domain 166, either without seeking user permission or after a user has granted permission (e.g. on an application-by-application or use-by-use basis).

The security system 162 of FIG. 6 is arranged to control data transfer between the first security domain and the second security domain. For example, the security system 162 may be arranged to prevent the at least one application from accessing the topological model. In this way, the topological model may be stored securely within the first security domain 166 of the storage 164, which is for example storage 164 of the user's portable device. The security system 162 may for example be implemented as an application firewall, which is arranged to control transfer of the topological model e.g. from an application of the first security domain 166 to applications of the second security domain 168. In some cases, the security system may have multiple security domains, for example using Arm® TrustZone®. This is merely an example, though. For example, a less secure application may be able to send information, e.g. about a garment, to the more secure domain (e.g. the first security domain 166) that contains the topological model. The more secure domain can then perform processing as desired, for example to determine if the garment fits a person represented by the topological model, and provide an indication to the less secure application regarding whether the garment fits or not.

The security system 162 may further prevent uploading of the topological model from the first security domain 166 to storage external to the portable device, e.g. cloud storage. This may further improve the data security of the topological model.

In some cases, the portable device includes a measurement generation engine to process the topological model to obtain measurement data based on a proportion of at least part of the object. The measurement generation engine may be implemented by a processor system such as that of FIG. 5, for example, or by computer-readable instructions stored in storage of or accessible to the portable device and implemented upon processing of the computer-readable instructions by at least one processor of the portable device. The measurement generation engine is for example arranged to extract measurements of the object. For example, if the object is a person, the measurement generation engine may be arranged to determine the person's foot shape, shoe size, waist measurement, height etc. from the topological model. The measurement data may then be processed in various different ways, e.g. based on knowledge of expected movement of the human musculoskeletal system.

In such cases, the measurement data may be stored in the first security domain 166. The security system 162 may be arranged to allow an application of the at least one application of the second security domain 168 to access the measurement data. For example, the application may be able to access less sensitive data, such as the measurement data, without accessing the underlying topological model, which may be considered more sensitive. The application may therefore be able to perform further processing using the measurement data, without receiving the topological model, which a user may prefer to keep private. Similarly, the security system 162 may be arranged to allow the application of the second security domain 168 to access other data associated with the topological model, such as metadata, e.g. if it is determined that this other data is not sensitive data.

In yet further cases, a user may be able to override the security system 162, e.g. to allow a particular application of the second security domain 168 to access the topological model. This provides flexibility and allows the user to decide how the topological model should be used. For example, as a default, the topological model may be stored in the first security domain 166 without other security domains, such as the second security domain 168 having access to the topological model. However, the user may be able to override this default. Such an override may be performed an on individual basis for a plurality of topological models. For example, a user may wish to share a topological model of an inanimate object with an application in the second security domain 168, but may wish to prevent sharing of a topological model of a person's body with the application.

The above examples are to be understood as illustrative examples. Further examples are envisaged.

In some examples, the object may be stationary and the portable device may be moved relative to the object to scan the object and produce the topological model. In other examples, the object may be moved while the portable device remains stationary, for example to determine topological characteristics of the model. In some cases, a plurality of scans of the object may be obtained with the object in different configurations, such as with a person standing or sitting in different stances. Topological models obtained with each of these scans may be combined to generate a combined topological model of the object, which may be more accurate than otherwise. In other cases, a plurality of radio waveforms may be reflected from the object while the object, or a part of the object, is in motion, and used to generate the topological model of the object.

Examples above involve beamforming at least one radio waveform for reflection from an object. In other cases, though, beamforming may be omitted and the radio waveform may be directed towards the object in a different manner. For example, the transmitted radio waveform may be generated as a spatially narrow beam, which has a greater amplitude in a particular direction than other directions.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of generating a topological model of an object, the method comprising:
    obtaining first pose data representative of a pose of a portable device during observation of an environment comprising the object, wherein the pose of the portable device represents a position and orientation of the portable device within the environment;
    obtaining distance data representative of a distance between the object and a receiver during the observation of the environment, using at least one radio waveform reflected from the object and received by the receiver, wherein the receiver comprises at least one antenna of the portable device and wherein each of the at least one antenna is a Wi-Fi antenna, respectively;
    processing the first pose data and transformation data representative of a transformation, during the observation of the environment, from a first frame of reference associated with the portable device to a second frame of reference associated with the receiver, to generate second pose data representative of a pose of the receiver during the observation of the environment, wherein the pose of the receiver represents a position and orientation of the receiver within the environment; and
    processing the second pose data and the distance data to generate the topological model of the object, wherein the topological model is a volume model of the object, in which a cross-sectional thickness of the object is modelled.

2. The method according to claim 1, comprising transmitting the at least one radio waveform using a transmitter of a transceiver comprising the receiver, for reflection from the object.

3. The method according to claim 1, wherein the at least one radio waveform comprises a radio waveform originated from a transmitter of a device separate from the portable device.

4. The method according to claim 1, wherein the at least one radio waveform is beamformed such that the at least one radio waveform is transmitted in a beamformed direction.

5. The method according to claim 4, comprising:
    obtaining beamforming data representative of at least one beamforming parameter associated with beamforming of the at least one radio waveform; and
    using the beamforming data to obtain the distance data.

6. The method according to claim 1, wherein the portable device is a smartphone or an augmented reality (AR) device.

7. The method according to claim 1, wherein the portable device comprises an image capture device, and the method comprises processing image data representative of the observation of the environment captured by the image capture device to obtain the first pose data.

8. The method according to claim 7, wherein the image data represents at least one image in which at least part of the object is obscured by a further object and the at least one radio waveform is transmitted through the further object before and after being reflected from the object and before being received by the receiver.

9. The method according to claim 7, wherein processing the second pose data and the distance data comprises processing the second pose data, the distance data and the image data to generate the topological model of the object, wherein the image data represents at least one color image of the environment and a color of the topological model is derived from the at least one color image.

10. The method according to claim 7, comprising:
    processing the image data to obtain attenuation data representative of an estimated attenuation of the at least one radio waveform by at least part of the object; and
    using the attenuation data to obtain the distance data.

11. The method according to claim 1, wherein the at least one radio waveform has a frequency within a range of approximately 40 gigahertz (GHz) to approximately 60 GHz.

12. A portable device comprising:
    a receiver comprising at least one antenna, wherein each of the at least one antenna is a Wi-Fi antenna, respectively;
    storage for storing:
        first pose data representative of a pose of the portable device during observation of an environment comprising an object, wherein the pose of the portable device represents a position and orientation of the portable device within the environment;
        distance data representative of a distance between the object and a receiver during the observation of the environment; and
        a topological model of the object, wherein the topological model is a volume model of the object, in which a cross-sectional thickness of the object is modelled;

at least one processor communicatively coupled to the storage; and a model generation engine operable to:

obtain the first pose data;

obtain the distance data using at least one radio waveform reflected from the object and received by the receiver;

process the first pose data and transformation data representative of a transformation, during the observation of the environment, from a first frame of reference associated with the portable device to a second frame of reference associated with the receiver, to generate second pose data representative of a pose of the receiver during the observation of the environment, wherein the pose of the receiver represents a position and orientation of the receiver within the environment; and process the second pose data and the distance data to generate the topological model of the object.

13. The portable device according to claim 12, wherein the portable device is a smartphone.

14. The portable device according to claim 12, wherein the portable device comprises an image capture device, and the model generation engine is operable to process image data representative of the observation of the environment captured by the image capture device to obtain the first pose data.

15. The portable device according to claim 12, comprising at least one of an inertial measurement unit (IMU) or a depth sensor for use in obtaining the first pose data.

16. The portable device according to claim 12, wherein the storage comprises:

a first security domain for storing the topological model; and a second security domain for storing application data representative of at least one application; and the portable device further comprises:

a security system to control data transfer between the first security domain and the second security domain, wherein the security system is arranged to prevent the at least one application from accessing the topological model.

17. The portable device according to claim 16, comprising a measurement generation engine to process the topological model to obtain measurement data based on a proportion of at least part of the object, wherein the security system is arranged to allow an application of the at least one application to access the measurement data.

18. The method according to claim 4, wherein the at least one radio waveform is beamformed in accordance with an Institute of Electrical and Electronics Engineers (IEEE) 802.11 family of standards.

* * * * *